United States Patent [19]
Banner

[11] 3,864,260
[45] Feb. 4, 1975

[54] MARINE WATER INLET DEVICE MEANS
[76] Inventor: Philip M. Banner, 28 Oxford Rd., Massapequa, N.Y. 11758
[22] Filed: Mar. 20, 1973
[21] Appl. No.: 343,121

[52] U.S. Cl.............. 210/108, 210/411, 210/427, 340/239 F
[51] Int. Cl............................................ B01d 35/16
[58] Field of Search .......... 210/108, 106, 242, 411, 210/409, 407, 425, 424, 420, 418, 427, 408; 340/239 F

[56] References Cited
UNITED STATES PATENTS
2,084,346  6/1937  Jones ................................. 210/108

Primary Examiner—Roy Lake
Assistant Examiner—DeWalden W. Jones

[57] ABSTRACT

A water inlet cleaning device for Marine Craft and fluid supply systems that will clean out the inlet pipe and inlet fitting from foreign matter, allowing liquid to flow. The device can operate manually or automatically, having a signal responsive means to indicate a clogging condition and the subsequent operation of the device.

15 Claims, 11 Drawing Figures

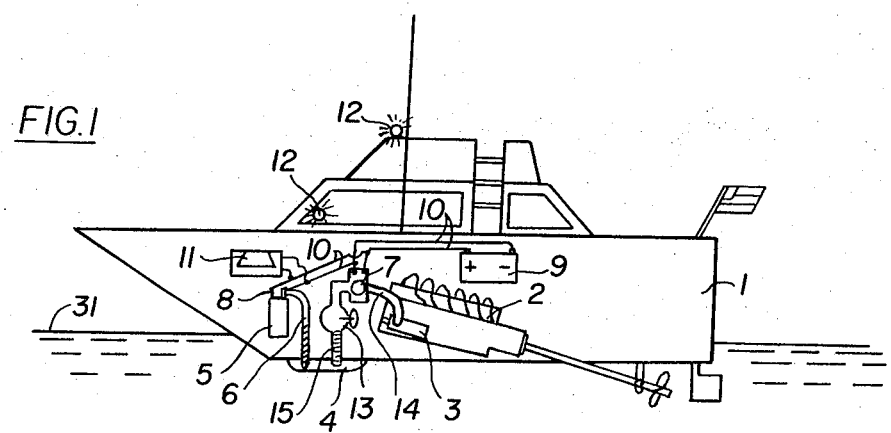
FIG.1
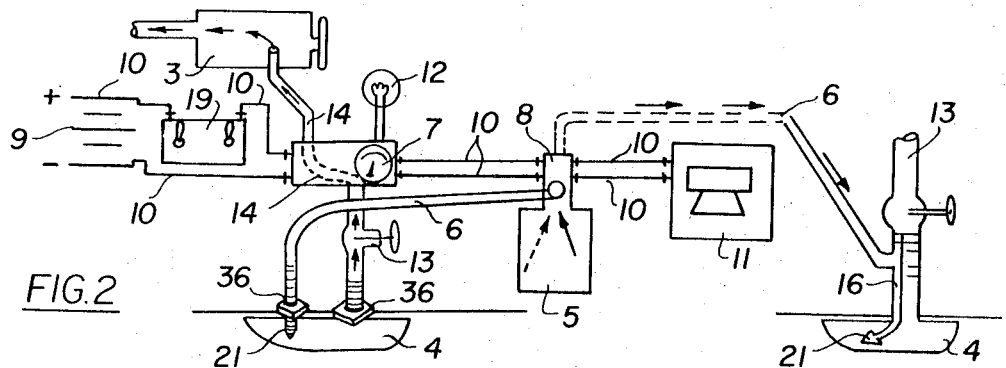
FIG.2
FIG.3
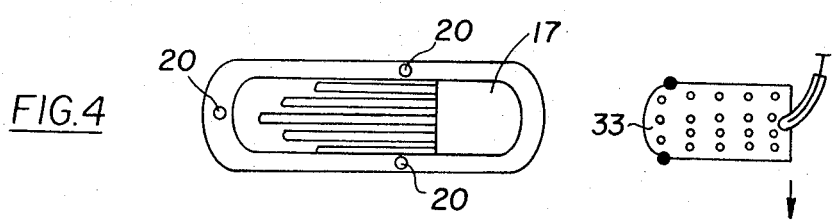
FIG.4
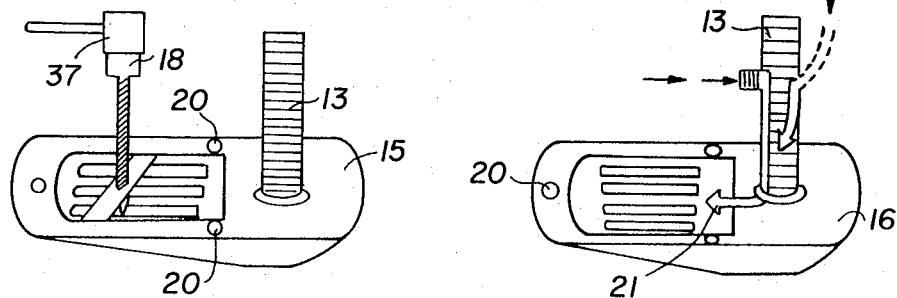
FIG.5
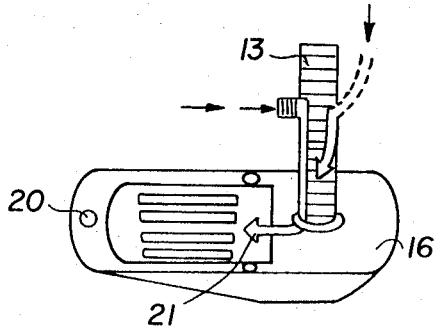
FIG.6

MARINE WATER INLET DEVICE MEANS

This invention relates to a water inlet device that incorporates various methods of assistance and safety to boatowners and equipment owners that depend upon the flow of water from an outside source. Particular reference is directed to the marine aspect wherein an unsuspecting navigator of a small boat or a ship suddenly loses the water supply necessary for cooling an engine. On small craft there are systems that use sea water for cooling while an alternate method is to use fresh water cooling and sea water for cooling the exhaust system, common to both systems is the need for water, that enters the craft through an inlet device on the bottom of the hull. The absence of water flow causes engine overheating, exhaust pipe overheating and hazardous conditions that can cause fires or damage an engine. The location of water inlet means on boats is usually under the boat having no means of access to clean it or observe any attendant conditions. The overheating of an engine reduces the engine life expectancy while the loss of water and heat cause extreme damage to the water pump and hoses. Once an engine has overheated it is difficult to assess heat cracks in the block, damaged gaskets and ring wear or engine contamination due to a cut-off in the water cooling supply system caused by obstructed inlet water systems.

The water inlet device will be very helpful in other examples where fluid or water supply is dependent upon an inlet opening on the suction side of the system. One excellent example would be a fire-hose placed in a supply area having a strainer unit or not, becoming clogged by debris. Such as on a boat, a piece of plastic or sea weed or any foreign matter will shut down the liquid supply. In other applications it will clear an inlet pipe, as well as the inlet fitting to great advantage. The combination of providing a form of safety, utility and saving the cost of unnecessary repairs or loss of an engine are contributing factors involved in this invention. The former art of continuing to provide boats with an inlet fitting that is not cleanable or accessible to a navigator suggests need for this important change.

These and other important features of the invention will now be described in detail in the following specification, naming each part and describing it's function as shown on the drawings, then pointed out more particularly in the appended claims.

A principal object of the invention is to provide new and improved water inlet device means for a boat.

Another object of the invention is to provide new and improved means of detecting a loss of liquid flow.

Another object of the invention is to provide a new water inlet device that will clear away an obstruction in a pipe or at the inlet fitting, on a boat or other water systems.

Another object of the invention is to provide a new and improved water inlet device that operates manually or automatically such as may be required in operating water cooled engines.

Another object of the invention is to safeguard water cooled engines and exhaust engine systems from overheating, prolonging their useful life expectancy.

Another object of the invention is to provide a new means of cleaning a inlet supply filter in a water system.

Another object of the invention is to provide new controls responsive to clogging conditions in inlet pipes or filters.

Another object of the invention is to provide new and improved pressurized air or liquids means for declogging a water inlet system.

These and other objects of the invention will be apparent from the following figures, of which:

FIG. 1 shows a side view of a boat, a water cooled engine installation and the parts of this invention in general use.

FIG. 2 shows the electrical circuitry to operate this invention and a more detailed breakdown of the components used in the example shown in FIG. 1, having a double entry through hull means.

FIG. 3 shows a side view of a modification of the inlet pipe and cleaning means, on a single entry through hull means.

FIG. 4 shows a bottom view of a boat inlet water means, and strainers.

FIG. 5 shows the side view construction features of a double entry through hull means having a check valve, and hand pump means.

FIG. 6 shows the side view of a single entry through hull means having alternate means of employing a pressure cleaning pipe or hose.

Figure 7:
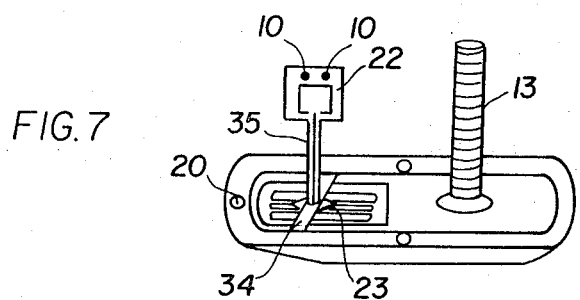
FIG. 7 shows the side view of a double entry through hull means having a modification of the cleaning apparatus.

FIG. 1 shows a boat 1 with a water cooled engine 2 having a water pump 3, a bottom inlet means 4 a air cylinder or water pressure cylinder 6, vacuum gauge and equipment 7, solenoid type electric valve 8 which is used as an example. The battery 9 provides electrical means through the wiring 10 that has a alarm 11 connected to it. A signal light 12 is shown up in the navigation area of the hull. A water inlet pipe and shut-off valve 13 is connected to a water line 14. The inlet device 15 shows a double through hull entry means, the water line is shown as 31 and the exhaust pipe 32. Although FIG. 1 is that of a boat the same would apply to any pump on a motor or firetruck as other examples.

FIG. 2 shows another view of the invention having a battery 9 supplying current to the wiring 10, showing a electrical switch assembly 19 shown as an example for manual and automatic position settings. The electric wiring 10 is then connected to the electrical terminals on the vacuum gauge equipment 7. When a stoppage of water supply on the suction side of the inlet system accurs at the bottom inlet 4 it causes the vacuum to increase to a pre-set point wherein the vacuum control assembly 7 has an electric switch that is connected to a pressure means 5, releasing same by opening an electric valve 8, said electric valve Releasing Compressed 5 pressurized water on air through a pipe 6 to the inlet device 4 cleaning same. At the same time a signal is transmitted from the vacuum control to a warning light 12 or an alarm means 11. Upon cleaning, the suction line is then opened and the water line 14 carries the water from the water inlet pipe 13. The position of the water pump on the engine is shown as 3 which pumps the water through the engine shown in FIG. 1. The pressure spray tip in the inlet device 4 is shown as 21.

FIG. 3 shows a single entry through hull device fitting that has the side entry 16 wherein the line 6 is connected to the side entry 16. This side entry 16 is permanently part of the single pipe example shown connection can be accomplished by threading the members or using a coupling or clamps. The spray tip 21 is shown in an example position in the bottom although it can be placed anywhere in the pipe 13 to effectively clean any part of the whole suction side of the inlet system.

Figure 10:
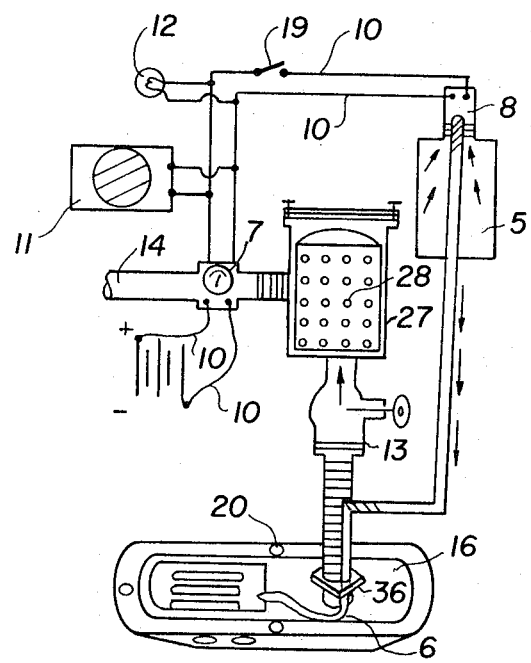
FIG. 10 shows another side view of a complete single entry through hull means having a water filter in the inlet line.
Figure 11:
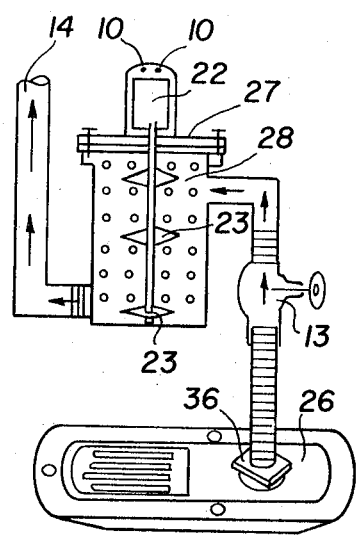
FIG. 11 shows a side view of a single entry through hull means having a means of cleaning the water filter.

FIG. 4 shows the bottom of an inlet device 17 attached by three screws and the locking of a threaded nut on the water inlet pipe shown in FIGS. 10 & 11. The bottom of the inlet device 17 has ample room within it to have installed a movable internal strainer shown as 33 operatable by a cable or arm, not shown. The use of such a strainer would be advisable in various situations where the water is very dirty with small objects.

FIG. 5 shows the inlet device 15 having a water pipe threded 13 and mounting holes 20. and a spray tip 21 with a check valve 18 on the pressure cleaning pipe 15, and a hand pump 37 for manual operation.

FIG. 6 shows a inlet device with a single through hull entry 16 having a threaded inlet pipe 13 ready for external connection. An alternate means of placing the pressure pipe is shown in a dotted line that would also clean out the pipe in this position.

FIG. 7 shows a water inlet device having a frame 34 holding a threaded shaft 35 connected to an electric motor 22 having wiring 10. Under the frame 34 connected to the shaft 35 is a sharp propellor 23 that will force water pressure downward cleaning the inlet device and at the same time, cut up the foreign matter in this area.

Figure 8:
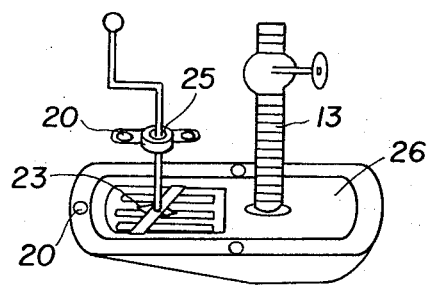
FIG. 8 shows a side view of a double entry through hull means showing a hand operated means of cleaning apparatus.

FIG. 8 shows a single inlet pipe 13 connected to the inlet device 26 that has a propellor 23 turned by a hand means 24. This hand means has a packing nut 25 to keep water out.

Figure 9:
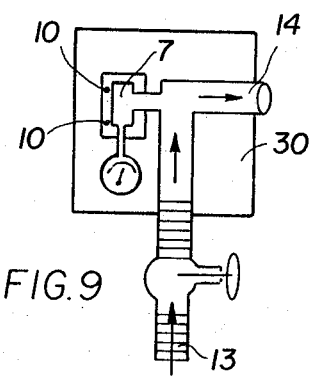
FIG. 9 shows a side view of a signal responsive vacuum gauge and electrical switch attached to the water pipe with an optional cover.

FIG. 9 shows a inlet water pipe & valve 13 connected to a water line 14. In the water line is a vacuum operated switch 7 showing a gauge which can be exposed or placed within a box covering 30. The wires 10 provide signal to the alarm stage and open the pressure system for cleanouts.

FIG. 10 shows a single pipe system with side entry 16 connected to a water filter 27 having a strainer element 28. The vacuum gauge and equipment 7 is connected by water line 14 to the filter 27. This filter is shown with a top means of opening for removal of the strainer element 28. Wiring is connected 10 to the alarm 11, signal light 12 and to the electric valve 8 on a compressed or pressure tank 5. The pressure line is shown as 6 mounting into the side of the inlet pipe 13, lock nut 36.

FIG. 11 shows a water inlet device 26 with a lock nut 36 connected to a filter 27 having a filter element 28. A motor 22 is attached to the cover of the filter 27 having a shaft and propellers operating within the filter. The pipe to the suction side of the water pump is shown as 14. The advantages are that when a system is clogged the filter as well as the bottom of the inlet device are cleaned. The self cleaning of a water or fluids filter is important to all engines.

The operational advantages of this invention are many. When a boat as shown in FIG. 1 contacts a piece of plastic or other foreign matter it will partially or fully close off the water supply to the engine. Whether partial or fully closing off the supply the danger and chance of damage is imminent. When this occurs it increases the vacuum in the suction side of the water system between the water inlet and the bottom inlet device opening. This increase in vacuum causes the vacuum gauge to show the vacuum pressure in inches while a vacuum pressure switch would open or close as desired to make an electrical contact. The gauge itself could be adapted for electrical use by or any number of vacuum switches which will trigger the system by signalling a warning light or alarm, by opening a electric valve releasing pressurized water or air to the bottom of a boats inlet pipe, cleaning out the obstruction and returning to normal in the off position when the vacuum has dropped to normal. The placement of pressure cleanout pipes within the pipe to the pump or from the bottom is immaterial one or more pipes placed in desired areas will render a solution to the problem of clogged water pipes under a boat that is inaccessible to the operator. Additional advantages are shown in FIG. 7 having an electrical shaft and impellor cutting means of disposing of foreign matter while pressurizing the area.

Another advantage is shown in FIG. 11 that has a electrical motor, shaft and propellor cleanout means of cleaning a water filter. This water filter will keep particles of dirt from entering the water pump which usually ruins the water pump. In this instance, the cleanout of the water filter can be done seperately or together with the cleaning of the bottom inlet device, insuring that all parts are clear. This modification is important to all inlet systems that catch dirt and often are left unattended for too long a period.

The case of a fire-truck having a inlet hose in a pond or a swimming pool would also apply as the inlet devices shown. A strainer used on such a pipe would become clogged and reduce the flow of water that could be prevented by the attachement of a pressure device. Other liquids also would use the inlet device to great advantage.

When a water system fails on a motor, such as the breakage of a water pump the vacuum is reduced, therefore the pressure equipment will not operate. This invention operates when the pump is good and water is not flowing due to clogging which is shown in vacuum increase. The vacuum gauge and equipment would have a low-limit setting to just ring an alarm if such would occur. In any event, the invention and the various modifications shown in FIGS. 1 through 11 show ample means of providing a inlet safety system that will benefit boat owners and industry. It will reduce fires, loss of life, loss of economy and increase the leisure time of people having boats. The pressurized part of the system shown as a pressure tank can be of replaceable type or rechargable, by air pressure through a valve in the tank. In another modification, a hand pump 37 is also shown in FIG. 5 as an alternate means of cleaning the inlet pipe.

It is obvious that minor changes may be made in the form and construction of this invention without departing from the spirit thereof. Naturally, it is desired to include all changes as come within the scope claimed.

I claim:

1. A water inlet device adapted for liquids flowing therethrough and subject to becoming clogged comprising an enclosure including a top and a bottom associated therewith, means to connect a pipe to said enclosure, a source of pressurized substance, and means to connect said source to said enclosure and discharging therein to blow out any clogged materal.

2. A water filter means of the type having an inside screen, having a means to rotate at least one internal propeller blade within said filter to pulverize sediment caught in said filter thereby being unrestrictive to the flow of liquids.

3. Apparatus as in claim 1 having said pressurized substance connected to a seperate pipe attached to the water inlet discharging into the inlet means.

4. Apparatus as in claim 1, wherein said source is a hand operated pump.

5. Apparatus as in claim 2 having a plurality of propeller blades spaced apart within the water filter, connected to a rotating shaft, operated by hand turning means.

6. Apparatus as in claim 2 having said propeller on a shaft connected within said filter and turned by electric motor means mounted on to said water filter.

7. A water inlet device adapted for liquids flowing therethrough and subject to becoming clogged comprising an enclosure including a top and a bottom associated therewith, means to connect a pipe to said enclosure, a source of pressurized substance, and means to connect said source to said enclosure and discharging therein to blow out any clogged material having a signal responsive electrical alarm means connected to said enclosure and a warning light that indicate a warning system when said inlet is clogged.

8. Apparatus as in claim 1 having a vacuum gauge and switch connected electrically to said water inlet device that operates at a preset vacuum condition when said inlet device is clogged releasing said pressurized substance to unclog it.

9. Apparatus as in claim 1 having an electric valve connected to a pressurized means operated by a vacuum control that controls the release of said pressurized substance electrically, opening in one position and closing said valve in another position when said clogging occurs.

10. Apparatus as in claim 1 having pre-filled pressurized matter in throwaway and refillable means for pressurizing said water inlet means.

11. Apparatus as in claim 1 having a propeller in the inlet strainer attached to a turning shaft secured to an inlet device electrically and hand driven to discharge foreign matter from said inlet.

12. Apparatus as in claim 2 having a signal responsive electrical alarm means and a warning electrical lamp actuate when said water filter becomes clogged.

13. Apparatus as in claim 2 having a vacuum gauge and switch connected electrically to said water filter means that operates said internal propeller when said water filter becomes clogged.

14. Apparatus as in claim 2 wherein said water filter is connected to an electrically operated valve that opens when said water filter becomes clogged permitting the ejection of clogged material.

15. Apparatus as in claim 2 wherein said water filter means is connected to a vacuum control and a pressurized substance so that when said water filter becomes clogged the vacuum control will release the pressurized substance into said water filter to clean and unclog it internally and externally

* * * * *